(12) United States Patent
Hung et al.

(10) Patent No.: US 12,158,853 B2
(45) Date of Patent: Dec. 3, 2024

(54) METHOD FOR DATA ACCESS CONTROL AMONG MULTIPLE NODES AND DATA ACCESS SYSTEM

(71) Applicant: REALTEK SEMICONDUCTOR CORP., Hsinchu (TW)

(72) Inventors: Yu-Hsuan Hung, Hsinchu (TW); Wei-Hao Fang, Hsinchu (TW); Kai-Ting Shr, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 42 days.

(21) Appl. No.: 18/325,124

(22) Filed: May 30, 2023

(65) Prior Publication Data

US 2023/0385217 A1 Nov. 30, 2023

(30) Foreign Application Priority Data

May 31, 2022 (TW) ................... 111120171

(51) Int. Cl.
*G06F 13/362* (2006.01)
*G06F 11/30* (2006.01)
*G06N 3/08* (2023.01)

(52) U.S. Cl.
CPC ........ *G06F 13/362* (2013.01); *G06F 11/3072* (2013.01); *G06N 3/08* (2013.01)

(58) Field of Classification Search
CPC .... G06F 13/362; G06F 11/3072; G06F 13/40; G06F 9/44; G06F 15/16; G06N 3/08; G06N 3/02; H04L 65/00
See application file for complete search history.

(56) References Cited

U.S. PATENT DOCUMENTS

| | | | | |
|---|---|---|---|---|
| 2006/0236192 A1* | 10/2006 | Friddell | ............ | H03M 13/6561 714/755 |
| 2010/0046532 A1* | 2/2010 | Okita | ............ | H04L 45/50 370/401 |
| 2011/0197002 A1* | 8/2011 | Deng | ............ | G06F 11/3423 710/110 |
| 2015/0199290 A1* | 7/2015 | Mathewson | ............ | G06F 13/364 710/110 |

(Continued)

FOREIGN PATENT DOCUMENTS

TW 200934197 A 8/2009

*Primary Examiner* — Phong H Dang
(74) *Attorney, Agent, or Firm* — Li & Cai Intellectual Property (USA) Office

(57) ABSTRACT

A method for data access control among multiple nodes and a data access system are provided. The data access system includes a data interconnect controller circuit that allocates resources of one or more slaves by one or more masters according to operating parameters of an interleaver, and includes an intelligent control module that collects use efficiency data of the one or more slaves and obtains a current setting of the data interconnect controller circuit via a monitor. The monitor calculates scores of use efficiency data. The scores and the setting are inputted to a neural network model. Parameters of the neural network model are adjusted according to the scores, and a new setting generated by the neural network model is applied to the interleaver of the data interconnect controller circuit, so that the data interconnect controller circuit performs access control among the multiple nodes with the new setting.

17 Claims, 6 Drawing Sheets

(56) References Cited

U.S. PATENT DOCUMENTS

| | | | |
|---|---|---|---|
| 2019/0130815 A1* | 5/2019 | Thien | G06F 13/00 |
| 2020/0410389 A1* | 12/2020 | Jain | G06F 9/44505 |
| 2021/0182661 A1* | 6/2021 | Li | H04L 41/16 |
| 2021/0240647 A1* | 8/2021 | Shr | G06F 13/362 |
| 2021/0255978 A1* | 8/2021 | Kim | G06F 9/38585 |
| 2021/0357347 A1* | 11/2021 | Li | G06F 13/4022 |

* cited by examiner

METHOD FOR DATA ACCESS CONTROL AMONG MULTIPLE NODES AND DATA ACCESS SYSTEM

CROSS-REFERENCE TO RELATED PATENT APPLICATION

This application claims the benefit of priority to Taiwan Patent Application No. 111120171, filed on May 31, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for data access control among multiple nodes and a system, and more particularly to a method for data access control among multiple masters and multiple slaves through an intelligent learning method and a data access system.

BACKGROUND OF THE DISCLOSURE

In a data access system, multiple masters are configured to commonly access multiple slaves. For example, multiple threads initiated by a processor are allocated to access various memories of a computer system, and a data interconnect controller circuit is required for deciding the slave into which or from which data of each of the masters is to be stored or read.

Through repeated practical simulation tests and based on past experiences, a conventional data access system determines a mutual access rule among multiple slaves. The mutual access rule regulates a time interval for data access between the master and the slave and decides an amount of data to be transmitted at a time for changing the slave to be accessed and determining a use sequence of the multiple slaves, so as to achieve the best use efficiency.

SUMMARY OF THE DISCLOSURE

In order to improve performance of allocating resources of multiple slaves to be accessed by multiple masters in a data access system and reach the best use efficiency, the present disclosure provides a method for data access control among multiple nodes and a data access system.

According to one embodiment of the data access system, main components of the data access system include a data interconnect controller circuit and an intelligent control module. The data interconnect controller circuit includes an interleaver that sets up operating parameters for allocating the resources. The data interconnect controller circuit allocates the resources of one or more slaves to be accessed by one or more masters in the data access system according to the operating parameters set by the interleaver. The intelligent control module collects one or more items of use efficiency data of the one or more slaves via a monitor, and operates a neural network that includes a trained neural network model.

The data access system performs the method for data access control among multiple nodes. In the method, the monitor is used to periodically retrieve the one or more items of use efficiency data of the one or more slaves. A current score for each of the one or more items of use efficiency data of the one or more slaves is calculated. A current setting of the data interconnect controller circuit is obtained through the monitor. Afterwards, the current score and the current setting are inputted to the neural network model. In the neural network model, parameters of the neural network model are adjusted according to the current score calculated by the monitor. A new setting for the data interconnect controller circuit is obtained. The data interconnect controller circuit is updated with the new setting, and the new setting is applied as the operating parameters to the interleaver, so as to allow the data interconnect controller circuit to perform access control among the multiple nodes with the new setting.

Preferably, the use efficiency data of the one or more slaves retrieved by the monitor includes a total amount of data written into each of the slaves at regular intervals and a total amount of data read from each of the slaves at the regular intervals.

Preferably, in the step of calculating the current score for each of the one or more items of use efficiency data of the one or more slaves, each of the one or more items of use efficiency data is multiplied by a weight for obtaining a score for each of the one or more items of use efficiency data, the scores are summed to obtain a total score, and the total score is regarded as the current score of the one or more items of use efficiency data.

Further, the operating parameters of the data interconnect controller circuit are used to control the one or more masters to access the one or more slaves, and the operating parameters include an access speed, an access time interval, or an interval data amount that is set for each of the masters to access each of the slaves, or a priority order set for each of the masters to access the multiple slaves.

Further, after the data interconnect controller circuit performs the access control among the multiple nodes with the new setting, the monitor of the intelligent control module can obtain one or more items of next use efficiency data of the one or more slaves, and the neural network model can be iteratively trained according to a score of the next use efficiency data calculated by the monitor, so as to dynamically update the setting of the data interconnect controller circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
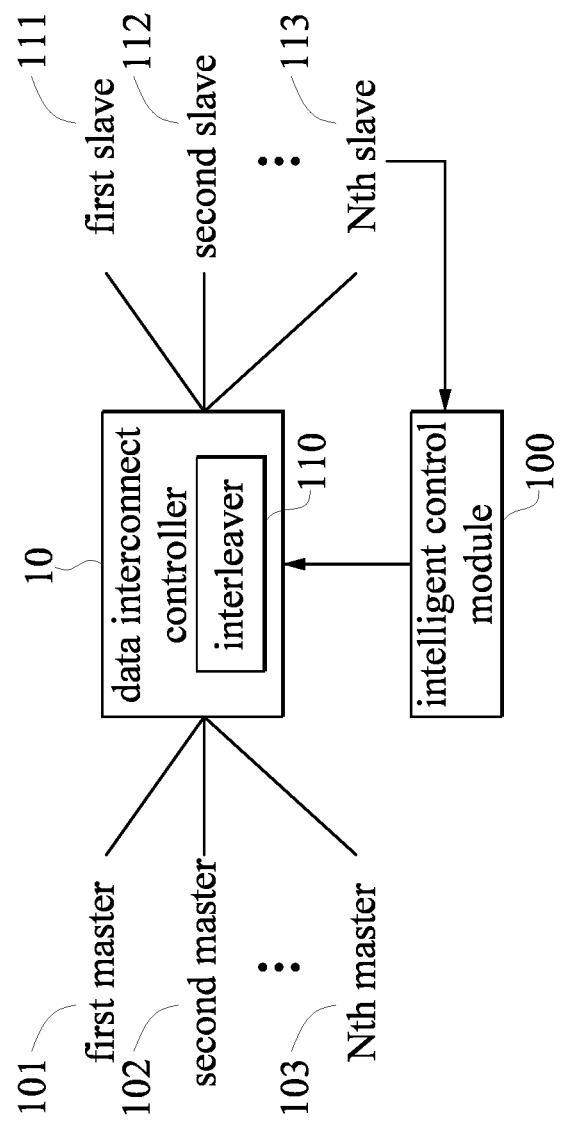
FIG. 1 is a schematic diagram showing a framework of a data access system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a method for data access control among multiple nodes and a data access system. FIG. 1 is a schematic diagram showing a framework of the data access system according to one embodiment of the present disclosure.

In the diagram, the data access system includes a data interconnect controller circuit 10, which is used to control one or more masters of the data access system to access resources of one or more slaves. For example, the data interconnect controller circuit 10 determines the slave (e.g., a first slave 111, a second slave 112 or an Nth slave 113) into which or from which data of each of the masters (e.g., a first master 101, a second master 102 or an Nth master 103) is to be stored or read.

In particular, the data interconnect controller circuit 10 includes an interleaver 110. The interleaver 110 has a setting that is used to operate the data interconnect controller circuit 10. The setting includes operating parameters that are referred to for allocating resources. The data interconnect controller circuit 10 can allocate the resources of the one or more slaves 111 to 113 to be accessed by the one or more masters 101 to 103 according to the operating parameters set by the interleaver 110.

According to one embodiment of the data access system of the present disclosure, a neural network model is used to optimize operations of the data interconnect controller circuit in the data access system and allow the data access system to operate with a best performance. Accordingly, the data access system utilizes an intelligent control module 100 to perform a neural network (NN), and includes a trained neural network model. When the data access system is in operation, the intelligent control module 100 operates in real time. The intelligent control module 100 uses a monitor to periodically collect one or more items of use efficiency data of the one or more slaves 111 to 113, and calculates a current score for each of the one or more items of use efficiency data of the one or more slaves. Then, a new setting that can be dynamically updated is generated by the neural network model for the data interconnect controller circuit 10.

In an exemplary example, the data access system can be implemented by a system on chip (SoC). The data interconnect controller circuit that is used to allocate the resources to be accessed allows multiple demand sides (e.g., the masters) to access various accessible resources (e.g., the slaves) in the system. In one further embodiment, in addition to using the method for data access control among multiple nodes in the above-mentioned SoC applications, the method can also be operated in an environment of computer network. The demand sides are, for example, multiple terminals that access various resources over network. The data interconnect controller circuit is configured to decide a time interval and a sequence for accessing the various resources.

According to the setting of the interleaver in the data interconnect controller circuit, the interleaver is able to allocate the accessible resources (i.e., the slaves) in the computer system and provide the resources for the demand sides (i.e., the masters). The demand sides are, for example, an image processor, a central processor or an electronic circuit that requires a large amount of resources for operation. The slaves represent the accessible resources, such as various memories and storages in the computer system. The memories can be a system memory (e.g., double data rate (DDR)), a cache memory, a disk storage, etc.

Figure 2:
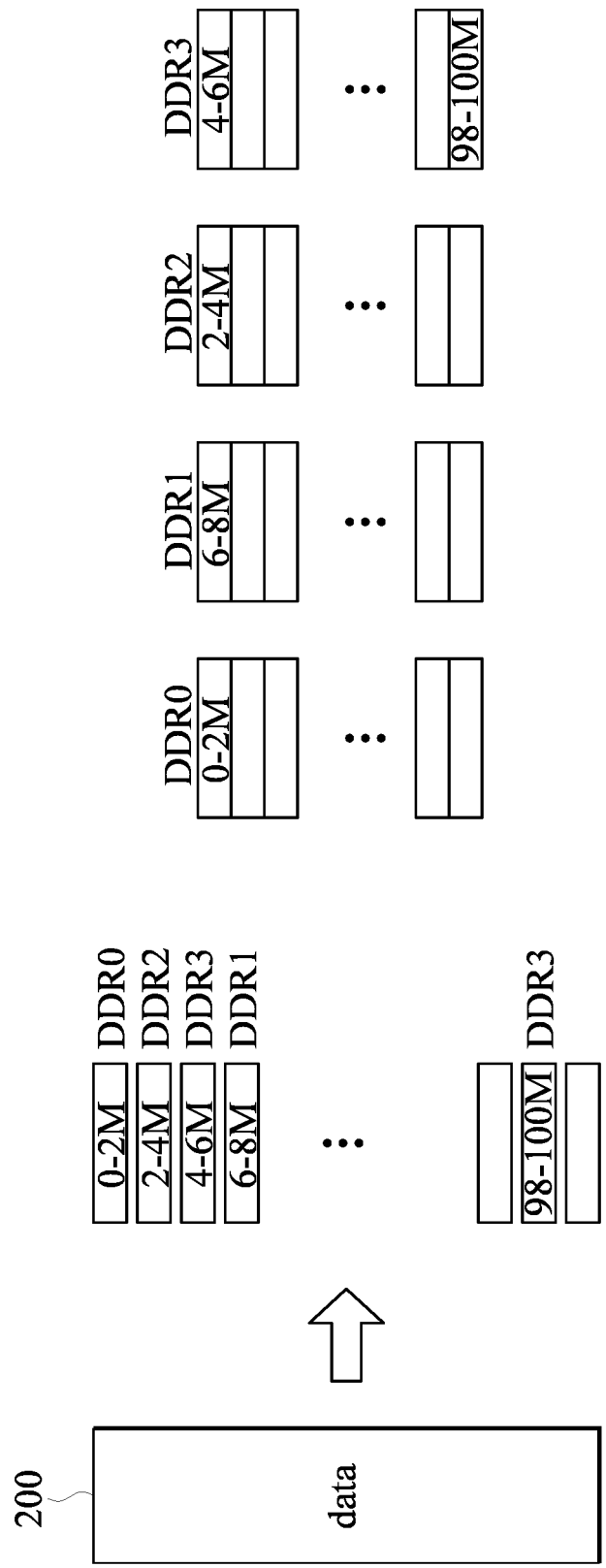
FIG. 2 is a schematic diagram showing an application of the data access system according to one embodiment of the present disclosure.

Reference is made to FIG. 2, which is an exemplary example that shows an application of the data access system. This example shows that the computer system relies on the data interconnect controller circuit to control a process of allocating the DDR data to be accessed by a processor.

Data 200 is initially inputted to the computer system. According to the setting of the interleaver in the data interconnect controller circuit, the DDR memory is sliced into multiple slices of data that are allocated to different memory blocks (e.g., four memory blocks DDR0, DDR1, DDR2 and DDR3).

The data 200 is allocated based on these memory blocks. As shown in the schematic diagram, the data 0 to 2M is stored to DDR0, the data 2M to 4M is stored to DDR2, the data 4M to 6M is stored to DDR3, the data 6M to 8M is stored to DDR1, and the data 98M to 100M is stored to DDR3. Accordingly, the whole data 200 is configured to be allocated to the DDR0, DDR1, DDR2, and DDR3.

Figure 3:
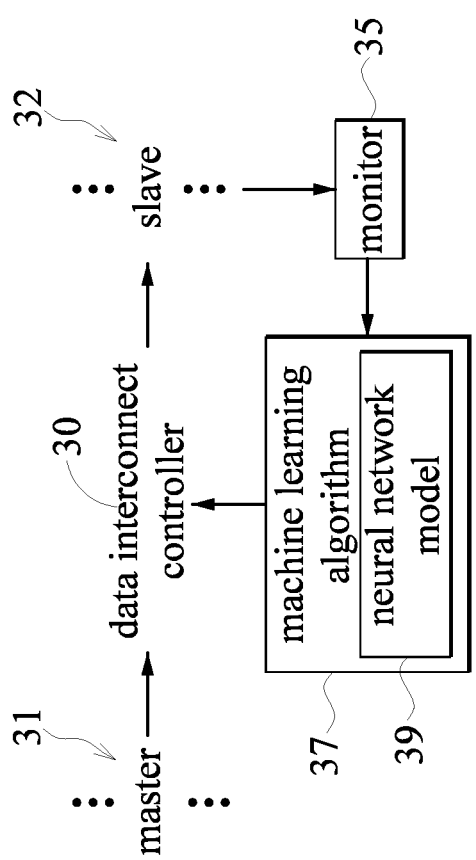
FIG. 3 is a schematic diagram showing a neural network model being trained through use of data accessed by multiple nodes according to one embodiment of the present disclosure.

In FIG. 2, according to the setting of the interleaver in the data interconnect controller circuit, the data is written into multiple slaves (i.e., the multiple DDR memory blocks). The data access system also performs the method for data access control among multiple nodes, in which a neural network model that has been trained with a huge amount of data is adopted. Reference is made to FIG. 3, which is a schematic diagram showing the neural network model being trained through use of the data accessed by the multiple nodes.

The data access system shown in the diagram includes a data interconnect controller circuit 30. According to the operating parameters set in the interleaver, the data interconnect controller circuit 30 allocates the resources of one or more slaves 32 to be accessed by one or more masters 31.

The data access system collects one or more items of use efficiency data of the one or more slaves 32 via the monitor 35. The use efficiency data can be statistical data with respect to use efficiency for accessing the slave 32. In one embodiment of the present disclosure, the use efficiency data includes a total amount of data to be written into each of the slaves at regular intervals and a total amount of data to be read from each of the slaves at the regular intervals. The data can be, for example, a throughput, latency, a power consumption, and a data rate in a unit time.

Initially, the use efficiency data becomes sample data that is used to train a neural network model 39 through a machine learning algorithm 37. In the process of machine learning, features of the sample data can be randomly extracted by methods such as classification, regression and deep learning. The features and correlations of the data can be learned from the sample data, so as to simulate a decision result of one or more masters accessing one or more slaves. One of the objectives of the simulation is to provide various access decisions for the data interconnect controller circuit. The simulation process can also be tuned manually for establishing the neural network model 39 that is used to generate the operating parameters applied to the data interconnect controller circuit.

Figure 4:
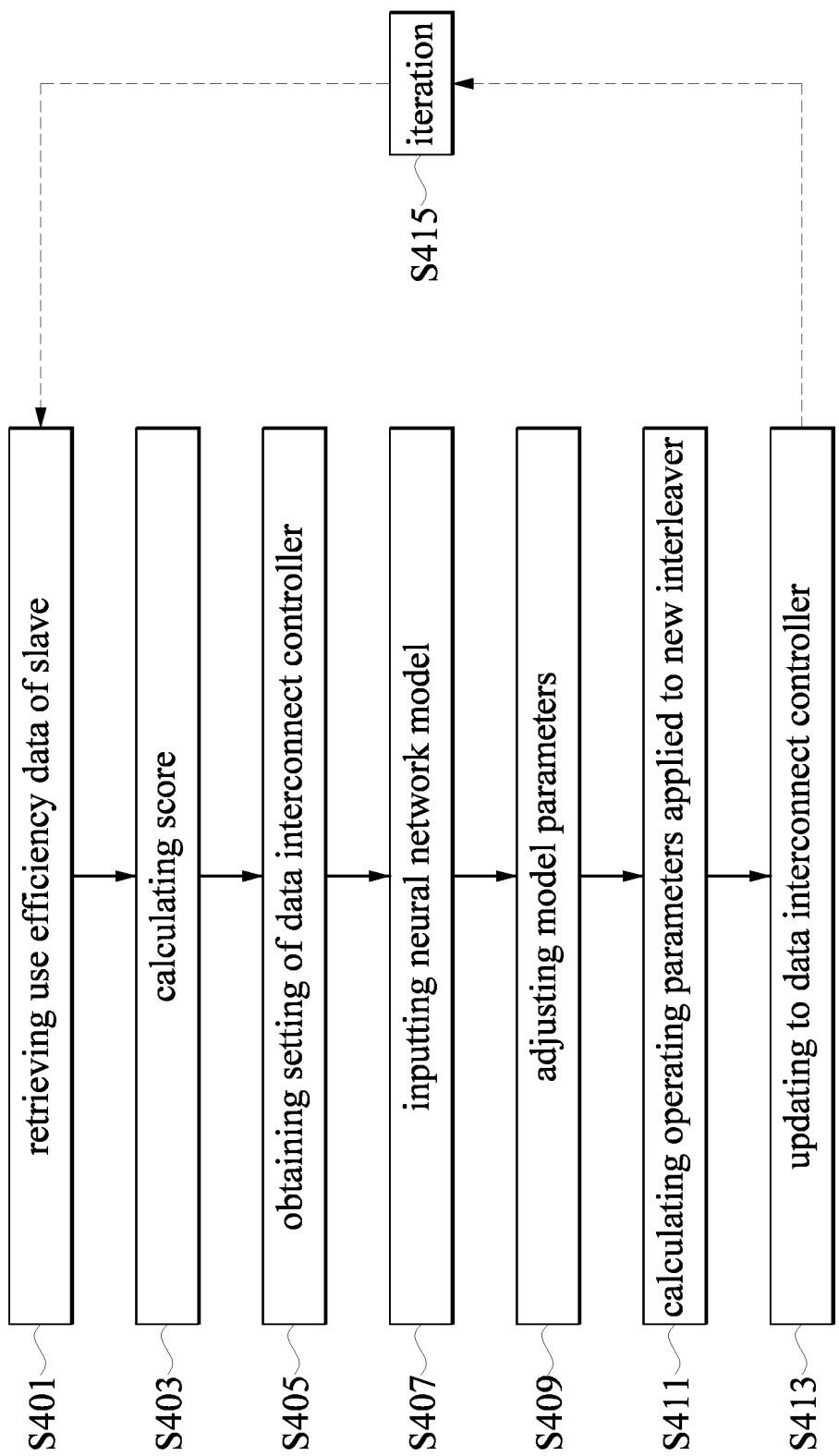
FIG. 4 is a flowchart illustrating a method for data access control among multiple nodes according to one embodiment of the present disclosure.

After the neural network model 39 is established, the neural network model 39 can be practically operated in the data access system, and the neural network model 39 can be iteratively trained through the real use efficiency data. The setting of the data interconnect controller circuit can be dynamically updated. Reference is made to FIG. 4, which is a flowchart illustrating the method for data access control among multiple nodes according to one embodiment of the present disclosure. The flowchart of FIG. 4 can be described in cooperation with a schematic diagram of the data access system shown in FIG. 5 and a schematic diagram that shows operation of a neural network unit in the data access system according to FIG. 6.

Figure 5:
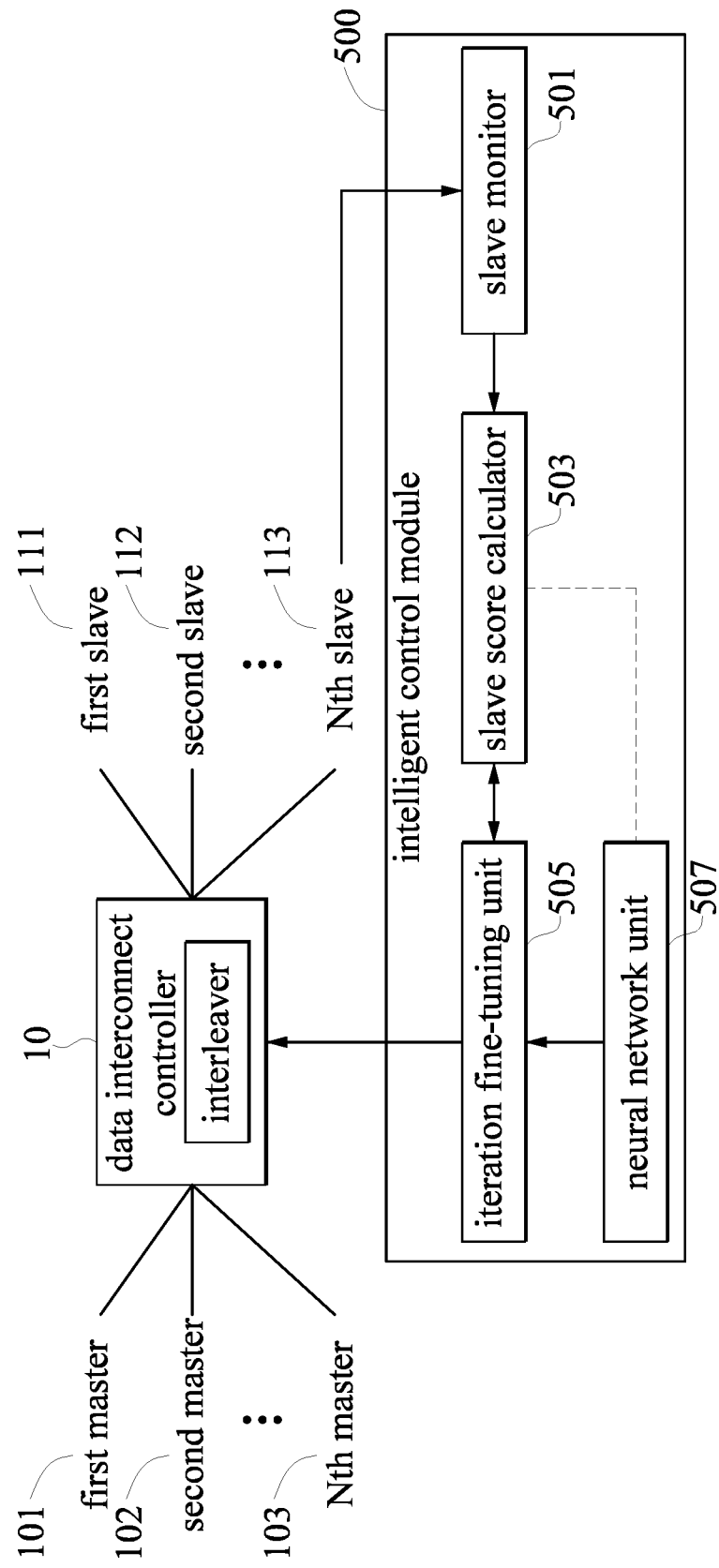
FIG. 5 is a schematic diagram of the data access system according to one embodiment of the present disclosure.

According to the above-mentioned embodiment of the data access system, an intelligent control module 500 of FIG. 5 is configured to implement a slave monitor 501 of FIG. 5 through collaboration of software and hardware. In the method for data access control among multiple nodes, one or more items of use efficiency data of the slaves 111 to 113 of FIG. 5 can be periodically retrieved via the slave monitor 501. For example, the data access system is configured to actively collect the use efficiency data of each of the slaves at regular intervals. The use efficiency data collected by the data access system includes one or multiple pieces of statistical data, such as a total amount of data written into each of the slaves within a time interval and a total amount of data read from each of the slaves within another time interval (step S401). The statistical data reveals a system status (e.g., the throughput, the latency, the power consumption and the data rate of the data access system in the unit time).

Next, through a slave score calculator 503 shown in FIG. 5, one or more items of use efficiency data of each of the slaves 111 to 113 (obtained through a statistical method) is used to calculate a score. In one embodiment of the present disclosure, each item of use efficiency data is multiplied by a weight that can be adjusted by a user, so as to obtain the score of each item of use efficiency data. The scores are summed to obtain a total score, and the total score can be regarded as the current score of the one or more items of use efficiency data (step S403).

In the meantime, the monitor actively retrieves a setting of the data interconnect controller circuit 10 that is currently used. This setting is mainly the setting of the interleaver 110 retrieved from the data interconnect controller circuit, and refers to the operating parameters for the master to access the one or more slaves through the data interconnect controller circuit. The operating parameters are, for example, an access speed and an access time interval for each of the masters 101 to 103 to access each of the slaves (step S405). The use efficiency data of the slaves and the setting of the data interconnect controller circuit are inputted to a neural network unit (507, FIG. 5). The use efficiency data and the setting act as an input of the neural network model (600, FIG. 6). In step S407, the current score of the use efficiency data in each of the slaves and the current setting of the data interconnect controller circuit (10, FIG. 5) are inputted to the neural network unit (507, FIG. 5). Afterwards, the neural network model (600, FIG. 6) adjusts parameters applied to the neural network model according to the current score calculated by the monitor (step S409). A new setting for the data interconnect controller circuit is calculated according to a new set of model parameters (step S411). Referring to FIG. 5, the new setting is a new set of operating parameters for the one or more masters (101 to 103, FIG. 5) to access the one or more slaves (111 to 113, FIG. 5) via the interleaver (110, FIG. 5) of the data interconnect controller circuit (10, FIG. 5).

In one embodiment of the present disclosure, the operating parameters can be an access speed, an access time interval and/or an interval data amount that is set for the master to access each of the slaves, or a priority order that is set for the master to access the multiple slaves. Taking the interval data amount as an example, through operation of the interleaver, the master changes the slave to be accessed every time the interval data amount is reached.

After the neural network model (600, FIG. 6) operates to output the new set of operating parameters applied to the interleaver (110, FIG. 5), the new set of operating parameters is fed back for updating the data interconnect controller circuit (10, FIG. 5), i.e., applying the new set of operating parameters to the interleaver (step S413). The data interconnect controller circuit of the data access system can fine tune the setting via an iteration fine-tuning unit 505 of FIG. 5. The new setting is applied to the data access system for operating access control among the nodes.

According to one embodiment of the present disclosure, when the new setting of the interleaver is fed back to the data interconnect controller circuit, the data interconnect controller circuit continues to receive the relevant data (i.e., the next use efficiency data of the slaves). Then, the monitor calculates a next score of the use efficiency data for adjusting the parameters of the neural network model. The iteration fine-tuning unit 505 of FIG. 5 continues to iteratively train the neural network model (step S415), so as to dynamically update the setting of the data interconnect controller circuit. Therefore, the purpose of continuously improving the performance of the data access system can be achieved.

Figure 6:
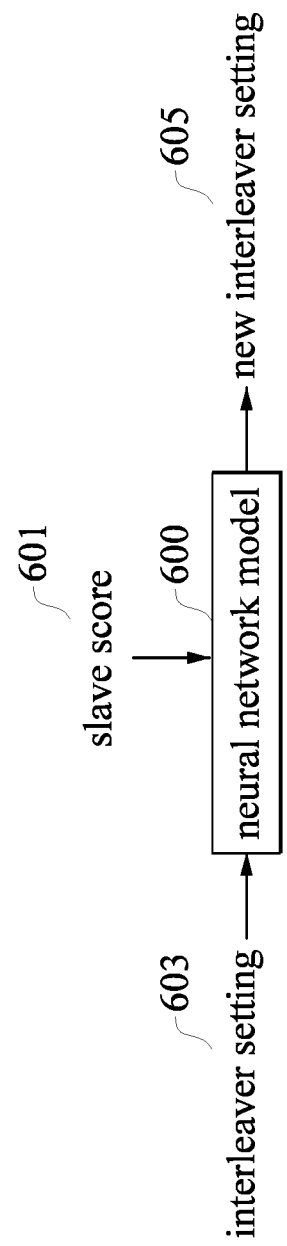
FIG. 6 is a schematic diagram showing operation of a neural network unit in the data access system according to one embodiment of the present disclosure.

Reference is made to FIG. 6, which is a schematic diagram showing operation of the neural network unit according to one embodiment of the present disclosure.

The neural network unit learns the use efficiency data operated in the data access system through a machine learning algorithm, so as to train the neural network model 600. The neural network model 600 can be optimized through an iterative process in a practical operation. In order to optimize the neural network model 600, a slave score 601 calculated by the monitor is obtained, and a current interleaver setting 603 is introduced for adjusting the parameters applied to the neural network model 600 according to the current score. A new interleaver setting 605 applied to the interleaver of the data interconnect controller circuit can be obtained.

Similarly, by repeating the above steps, the new setting is updated to the data interconnect controller circuit and applied to the interleaver. Therefore, the data interconnect controller circuit can perform the access control among the multiple nodes with the new setting. In the method for data access control among multiple nodes, when the data access system is in operation, the monitor continuously retrieves one or more items of use efficiency data of the one or more slaves. According to the next score of the use efficiency data calculated by the monitor, the neural network model 600 can be iteratively trained to dynamically update the setting of the data interconnect controller circuit.

In conclusion, in the method for data access control among multiple nodes and the data access system provided by the present disclosure, operating data of the data access system can be obtained through a statistical method and is used to adjust the operating parameters via an intelligent model. The trained neural network model can dynamically update the operating parameters applied to the data interconnect controller circuit. In this way, the data interconnect controller circuit can effectively allocate the resources of the slaves to be accessed by the masters. The data access system can also be continuously updated for optimization.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for data access control among multiple nodes, comprising:
   using a monitor to periodically retrieve one or more items of use efficiency data of one or more slaves of a data access system;
   calculating a current score for each of the one or more items of use efficiency data of the one or more slaves;
   obtaining, through the monitor, a current setting of a data interconnect controller in the data access system;
   inputting the current score for each of the one or more items of use efficiency data and the current setting of the data interconnect controller to a neural network model;
   adjusting parameters applied to the neural network model according to the current score that is calculated by the monitor for each of the one or more items of use efficiency data, so as to obtain a new setting for the data interconnect controller; and
   updating the data interconnect controller with the new setting, and applying the new setting as operating parameters to an interleaver, so as to allow the data interconnect controller to perform access control among the multiple nodes with the new setting.

2. The method according to claim 1, wherein, after the data interconnect controller performs the access control among the multiple nodes with the new setting, the monitor obtains one or more items of next use efficiency data of the one or more slaves, and the neural network model is iteratively trained according to a score of the next use efficiency data calculated by the monitor, so as to dynamically update the setting of the data interconnect controller.

3. The method according to claim 2, wherein, in the step of calculating the current score for each of the one or more items of use efficiency data of the one or more slaves, each of the one or more items of use efficiency data is multiplied by a weight for obtaining a score for each of the one or more items of use efficiency data, the scores are summed to obtain a total score, and the total score is regarded as the current score of the one or more items of use efficiency data.

4. The method according to claim 1, wherein the use efficiency data of the one or more slaves retrieved by the monitor includes a total amount of data written into each of the slaves at regular intervals and the total amount of data read from each of the slaves at the regular intervals.

5. The method according to claim 4, wherein, after the data interconnect controller performs the access control among the multiple nodes with the new setting, the monitor obtains one or more items of next use efficiency data of the one or more slaves, and the neural network model is iteratively trained according to a score of the next use efficiency data calculated by the monitor, so as to dynamically update the setting of the data interconnect controller.

6. The method according to claim 1, wherein the setting of the data interconnect controller includes the operating parameters for one or more masters to access the one or more slaves through the interleaver in the data interconnect controller.

7. The method according to claim 6, wherein the operating parameters of the data interconnect controller are used to control the one or more masters to access the one or more slaves, and the operating parameters include an access speed, an access time interval, or an interval data amount that is set for each of the masters to access each of the slaves, or a priority order set for each of the masters to access the multiple slaves.

8. The method according to claim 7, wherein, after the data interconnect controller performs the access control among the multiple nodes with the new setting, the monitor obtains one or more items of next use efficiency data of the one or more slaves, and the neural network model is iteratively trained according to a score of the next use efficiency data calculated by the monitor, so as to dynamically update the setting of the data interconnect controller.

9. A data access system, comprising:
   a data interconnect controller circuit including an interleaver, wherein the interleaver includes a setting that sets up operating parameters for allocating resources, so that the data interconnect controller circuit allocates the resources of one or more slaves to be accessed by one or more masters according to the setting of the interleaver; and a control circuit configured to collect one or more items of use efficiency data of the one or more slaves via a monitor, and to operate a neural network that includes a trained neural network model;

wherein the data access system operates steps including:
using the monitor to periodically retrieve the one or more items of use efficiency data of the one or more slaves;

calculating a current score for each of the one or more items of use efficiency data of the one or more slaves;

obtaining, through the monitor, a current setting of the data interconnect controller circuit of the data access system;

inputting the current score for each of the one or more items of use efficiency data and the current setting for the data interconnect controller circuit to the neural network model;

adjusting parameters applied to the neural network model according to the current score that is calculated by the monitor for each of the one or more items of use efficiency data so as to obtain a new setting for the data interconnect controller circuit; and updating the data interconnect controller circuit with the new setting, and applying the new setting as the operating parameters to the interleaver so as to allow the data interconnect controller circuit to perform access control among the multiple nodes with the new setting.

10. The data access system according to claim 9, wherein, after the data interconnect controller circuit operates access control among the nodes with the new setting, the monitor obtains one or more items of next use efficiency data of the one or more slaves, the neural network model is iteratively trained according to a score of the next use efficiency data calculated by the monitor, and the setting of the data interconnect controller circuit is dynamically updated.

11. The data access system according to claim 9, wherein the use efficiency data of the one or more slaves retrieved by the monitor includes a total amount of data written into each of the slaves at regular intervals and the total amount of data read from each of the slaves at the regular intervals.

12. The data access system according to claim 11, wherein, in the step of calculating the current score for each of the one or more items of use efficiency data of the one or more slaves, each of the one or more items of use efficiency data is multiplied by a weight for obtaining the a score for each of the one or more items of use efficiency data, the scores are summed to obtain a total score, and the total score is regarded as the current score of the one or more items of use efficiency data.

13. The data access system according to claim 12, wherein, after the data interconnect controller circuit performs the access control among the multiple nodes with the new setting, the monitor obtains one or more items of next use efficiency data of the one or more slaves, and the neural network model is iteratively trained according to a score of the next use efficiency data calculated by the monitor, so as to dynamically update the setting of the data interconnect controller circuit.

14. The data access system according to claim 9, wherein the operating parameters set for the data interconnect controller circuit are used to control the one or more masters to access the one or more slaves, and the operating parameters include an access speed, an access time interval, or an interval data amount that is set for each master to access each slave, or a precedence set for each master to access multiple slaves.

15. The data access system according to claim 14, wherein, after the data interconnect controller circuit performs the access control among the multiple nodes with the new setting, the monitor obtains one or more items of next use efficiency data of the one or more slaves, and the neural network model is iteratively trained according to a score of the next use efficiency data calculated by the monitor, so as to dynamically update the setting of the data interconnect controller circuit.

16. The data access system according to claim 9, wherein the one or more masters is an image processor or a central processor of a computer system, and the one or more slaves is one of various memories and storages of the computer system.

17. The data access system according to claim 16, wherein, after the data interconnect controller circuit performs the access control among the multiple nodes with the new setting, the monitor obtains one or more items of next use efficiency data of the one or more slaves, and the neural network model is iteratively trained according to a score of the next use efficiency data calculated by the monitor, so as to dynamically update the setting of the data interconnect controller circuit.

\* \* \* \* \*